Patented Feb. 11, 1936

2,030,221

UNITED STATES PATENT OFFICE 2,030,221

METHOD OF PRODUCING PLASTIC MASSES, ETC., CONTAINING CELLULOSE ESTERS

Richard Müller, Heidelberg, Martin Schenck, Mannheim, and Wilhelm Wirbatz, Mannheim-Waldhof, Germany, assignors to C. F. Boehringer & Soehne G. m. b. H., Mannheim-Waldhof, Germany No Drawing. Application January 13, 1933, Serial No. 651,628. In Germany January 20, 1932

15 Claims. (Cl. 18—55)

Our invention refers to the manufacture of artificial products including silk, films, other plastic masses intermediate layers for non-splintering glass, varnishes and the like, from cellulose esters and one of its objects is to improve the process disclosed in our copending application for patent of the United States, Serial No. 522,510, filed March 13, 1931.

In the specification forming part of this prior application we have shown that products, such as artificial silk, films, other plastic masses, lacquers, varnishes and the like of excellent quality may be obtained from the primary triacetate of cellulose without subjecting same to hydrolytic decomposition to form the secondary diacetate therefrom, if a triacetate is used, which is free of such catalytic components, which might later on cause decomposition. We have shown that such products can be obtained by treating cellulose with an acetylation mixture free of catalysts, such as sulfuric acid, which might remain in the acetylation product in linked form and might impair its stability, and maintaining the fibrous structure of the cellulose throughout the acetylation stage, the cellulose acetate thus obtained being washed, dried and thereafter subjected to further treatment without previously decomposing it hydrolytically.

The artificial products produceable from such primary acetates are at least as stable as the products obtained from the socalled acetone-soluble cellulose acetates and are distinguished from these latter products by greater strength, lower sensitivity against the action of water, higher insulating power with respect to heat and electricity etc.

We have now found that the artificial products obtainable in this manner can be further improved, more especially with respect to suppleness, elasticity and extensibility, if the primary acetates, before being treated for the production of the final products, such as artificial silk, films, other plastic masses, lacquers, etc., are subjected to a slight saponifying action. We have further found that this latter treatment offers considerable advantages also if applied to other esters and to mixed esters of cellulose, but also to esters containing other groups e. g. ether groups.

Saponification of the esters can be effected by means of compounds of weak acid reaction, such as for instance dilute acids. Dilute mineral acids, such as hydrochloric, nitric and perchloric acids may be employed but it is also possible to employ acetic acid or a mixture of acetic and perchloric acids.

It is important that only a slight saponification take place, whereby the acid content of the ester under treatment is not reduced more than about 5%. For instance if a cellulose acetate containing 62.3% acetic acid shall be saponified according to the present invention, the percentage of acetic acid should not be reduced beyond about 57.3%. For if saponification were allowed to proceed further, the valuable properties of the primary esters would get lost. On the other hand, in certain cases a reduction of the percentage of acid in the ester of not more than 1% will suffice to bring about an appreciable increase in elasticity and extensibility of the products. As shown by the tests described in the following examples, the present invention enables artificial products to be obtained, which possess all the valuable properties aimed at, which are desirable in view of the further uses to which they are being put.

In contradistinction to the known processes of converting socalled cellulose triacetates or chloroform-soluble cellulose acetates into socalled cellulose diacetates or acetone-soluble cellulose acetates, the treatment according to the present invention has not for its purpose nor does it require to bring about a change in the solubility of the primary esters. Thus the primary esters which have been subjected to an only slight subsequent treatment with saponifying agents resemble on the whole, as far as their solubility is concerned, the primary esterification products themselves. More especially, the partially saponified acetates obtained from true, non-decomposed cellulose triacetates, and which are distinguished from these latter compounds by a percentage of acetic acid which is up to 5% lower, do not possess the solubility in acetone, which the secondary acetates are otherwise required to possess. However, in other cases, for instance in the case of certain mixed esters, which possess an altogether different solubility from the beginning, the slight saponification may render esters previously insoluble in acetone soluble in this solvent.

The present invention is therefore designed to improve the production of artificial products, such as artificial silk, films, other plastic masses, intermediate layers for non-splintering glass, lacquers and the like from cellulose esters and more especially cellulose acetate and from mixed cellulose esters, which were produced from isolated, especially from fibriform cellulose esters obtained under exclusion of catalysts, such as sulfuric acid, which might remain over in the acetylation product in a linked form and might impair its stability. The cellulose used as starting material is preferably esterified in the presence of substances, such as cyclohexanol acetate, ethylacetate, benzene, toluene, ligroin or the like, or mixtures thereof, in order to preserve the fibrous structure of the starting material. We may, however, also subject to partial saponification the precipitated primary esters.

The cellulose esters may be produced from all suitable kinds of cellulosic material. In converting the products thus obtained into the final artificial products (silk, films etc.) we may add a solvent and gelatinizing and/or softening agents of a well known kind.

In practising our invention we may for instance proceed as follows:

Example 1

100 parts cellulose linters are submerged in glacial acetic acid. After four hours' digestion most of the liquid is removed by centrifuging, whereupon the cellulose thus treated is introduced into an acetylating mixture, which has been cooled down to about 5° C. and consists of 315 parts by weight of a 90 to 91% acetic anhydride, 363 parts acetic acid, 705 parts toluene and 1 part of a 70% solution of perchloric acid which may also be replaced by the corresponding quantity of a salt of this acid. The acetylation reaction is carried through at a temperature slowly rising up to 20 to 25° C. When samples of the fibres are found to be soluble in a mixture of 9 parts by volume methylene chloride and 1 part ethyl alcohol, all the fibres are separated from the acetylation mixture by centrifuging, whereupon they are carefully washed with water and dried. They now show a fair woolly appearance and substantially consist of cellulose triacetate containing about 62.3 to 62.5% acetic acid.

The cellulose triacetate thus obtained is now treated about 18 hours at ordinary temperature with the 15-fold quantity of a 3-normal hydrochloric acid. By this treatment the percentage of acetic acid in the cellulose triacetate is lowered to about 60.8%. The product is now subjected to centrifuging, washed and dried. It is clearly soluble in a mixture of methylene chloride and alcohol. Its charring point is about 250 to 270° C.; only at this temperature the product will assume a slight yellow colour.

Films, artificial silk, etc. produced in a well known manner from this cellulose acetate product are absolutely stable and do not practically differ from artificial products produced from the primary acetates as far as strength, sensitivity against the action of water and insulating power are concerned. On the other hand their suppleness, elasticity and extensibility have been increased by the slight treatment with saponifying agents in a surprising manner. The test figures for breaking strength on bending, for elongation and tensile strength of a film produced in this manner are 160—132—98, respectively, assuming the same figures of a film produced from the starting material (cellulose triacetate) to be 100.

Example 2

100 parts cotton are submerged in glacial acetic acid. After 4 hours' digestion most of the liquid is removed by centrifuging, whereupon the cellulose thus treated is introduced into a mixture of 400 parts of a 90 to 92% acetic anhydride, 550 parts cyclohexanol acetate and 200 parts zinc chloride dissolved in 60 parts acetic acid. Acetylation is carried through until the fibrous acetylation product is shown to be soluble in a mixture of 9 parts by volume methylene chloride and one part by volume alcohol. The fibres are then pressed in order to remove the acetylating liquor and washed and dried.

Instead of zinc chloride alone as catalyst the esterification may also be effected with zinc chloride and an acid as catalytically active substances.

The fibriform cellulose triacetate thus obtained, which contains 62.3 to 62.5% acetic acid, is treated at 20° C. with about the 15-fold quantity of a 1 to 1½-normal nitric acid. After the lapse of about 16 hours the acetic acid contents of the ester is lowered to about 61%. The product is now subjected to centrifugation and is washed and dried. It can be converted into films or other artificial products in a well known manner, for instance by dissolving 1 part by weight in 6 to 10 parts, according to its viscosity, of a mixture containing 92% by volume methylene chloride and 8% ethyl alcohol.

The mechanical properties of films produced in this manner are represented by the test figures 160 for breaking strength on bending, 120 for elongation and 100 for tensile strength, if the same properties of the primary acetate not subjected to saponification are set down as 100.

Example 3

A fibriform cellulose triacetate containing 62.5% acetic acid, which was produced as described in Example 1 or 2, may be partially saponified with a 10% nitric acid or a 3 normal hydrochloric acid as above described, the acid being however allowed to act thereon somewhat longer, until the contents of acetic acid has dropped to 59.5 to 60.0%.

A similar result can be obtained by acting on the primary acetate with quantities, as hereinbefore described, of normal perchloric acid or a 60% acetic acid, the action of which latter may be enhanced for instance by operating at an elevated temperature or by adding to the acetic acid some perchloric acid and operating at room temperature.

Films made from the partial saponification product thus obtained, which contains about 59.7% acetic acid, show a breaking strength on bending of 198, an elongation of 188, and a tensile strength of 95, setting the same properties of the non-saponified primary acetate down as 100.

Example 4

100 parts cotton cellulose are treated 4 hours with about 1000 parts glacial acetic acid. After centrifugation the cellulose thus treated is esterified with the aid of a mixture of 420 parts of a 90% acetic anhydride, 600 parts toluene, about 400 parts, sulfurous acid, 100 parts isovaleric acid and 0.7 part perchloric acid (caluculated as a 100% acid). Esterification begins at about 15° C. After about 9½ hours the product has become soluble in a mixture of methylene chloride and alcohol.

The fibriform primary esterification product thus obtained, whose total acid contents (calculated for acetic acid) is 61.8%, is treated during about 20 hours under agitation at a temperature of about 20° C. with about 1½-normal nitric acid, the acid contents being reduced by this treatment to about 57.8%.

The mechanical properties of films produced from this product after centrifugation, washing and drying are illustrated by the comparative test figures 210 for breaking strength on bending, 130 for elongation and 99 for tensile strength.

Various changes may be made in the details disclosed in the foregoing specification without departing from the invention or sacrificing the advantages thereof.

We claim:

1. The method of treating cellulose products for the manufacture of shaped articles, which comprises esterifying a cellulose product to form a triester with an esterification mixture free of catalysts partly remaining in linked form in the non-saponified product and causing instability thereof, treating the isolated cellulose triester thus obtained with a saponifying agent of acid reaction in such manner as to reduce its acid content by 5% at the utmost, to leave the solubility characteristics of the said triester practically unchanged, dissolving the product in a solvent, shaping the solution and removing the solvent.

2. The method of treating cellulose products for the manufacture of shaped articles, which comprises esterifying a cellulose product to form a triester with an esterification mixture free of catalysts partly remaining in linked form in the non-saponified product and causing instability thereof, maintaining the fibriform structure of the cellulose throughout the esterification process, treating the isolated cellulose triester thus obtained with a saponifying agent of acid reaction in such manner as to reduce its acid content by from about 1 to 5%, the solubility characteristics of the original triester remaining however practically unchanged, dissolving the product in a solvent, shaping the solution and removing the solvent.

3. The method of treating cellulose products for the manufacture of shaped articles, which comprises esterifying a cellulose product to form a triester with an esterification mixture free of catalysts partly remaining in linked form in the non-saponified product and causing instability thereof, but containing perchloric acid as catalyst, treating the isolated cellulose triester thus obtained with a saponifying agent of acid reaction in such manner as to reduce its acid content by 5% at the utmost, the solubility characteristics of the original triester remaining however practically unchanged, dissolving the product in a solvent, shaping the solution and removing the solvent.

4. The method of treating cellulose products for the manufacture of shaped articles, which comprises esterifying a cellulose product to form a triester with an esterification mixture free of catalysts partly remaining in linked form in the non-saponified product and causing instability thereof, but containing zinc chloride as catalyst, treating the isolated cellulose triester thus obtained with a saponifying agent of acid reaction in such manner as to reduce its acid content by 5% at the utmost, the solubility characteristics of the said triester remaining however practically unchanged, dissolving the product in a solvent, shaping the solution and removing the solvent.

5. The method of treating cellulose products for the manufacture of shaped articles, which comprises esterifying a cellulose product to form a triester with an esterification mixture free of catalysts partly remaining in linked form in the non-saponified product and causing instability thereof, treating the isolated cellulose triester thus obtained with dilute acetic acid in such manner as to reduce its acid content by about 1 to 5%, the solubility characteristics of the original triester remaining however practically unchanged, dissolving the product in a solvent, shaping the solution and removing the solvent.

6. The method of treating cellulose products for the manufacture of shaped articles, which comprises esterifying a cellulose product to form a triester with an esterification mixture free of catalysts partly remaining in linked form in the non-saponified product and causing instability thereof, treating the isolated cellulose triester thus obtained with a mixture of dilute acetic acid and some perchloric acid in such manner as to reduce its acid content by 5% at the utmost, the solubility characteristics of the said triester remaining however practically unchanged, dissolving the product in a solvent, shaping the solution and removing the solvent.

7. The method of treating cellulose products for the manufacture of shaped articles, which comprises treating a cellulose triacetate free from residual catalysts which might give rise to decomposition of the ester, with a saponifying agent of acid reaction in such manner as to reduce its acid content by 5% at the utmost and to produce an ester lacking the solubility in acetone which is a characteristic of the diacetates, the solubility characteristics of the triester forming the starting product remaining however practically unchanged, dissolving the product in a solvent, shaping the solution and removing the solvent.

8. A shaped manufactured article of a cellulose ester, this latter being formed, from a primary esterification product of cellulose free from any linked residual catalyst and containing practically the percentage of acid which theoretically corresponds to a triester, by a mild acid saponification process which reduces the acid content by 5% at the utmost, the solubility properties of the product thus obtained being practically the same as those of the non-hydrolyzed cellulose ester, the charring point of the said product being about 250 to 270° C.

9. A shaped manufactured article of a cellulose ester, this latter being formed from a primary esterification product of cellulose, which is free from any linked residual catalyst, and contains practically the theoretical acid content of a triester, by a mild acid saponification process which reduces the acid content by about 1.5 to 3.5%, the solubility properties of the product thus obtained being practically the same as those of the non-hydrolyzed cellulose ester, the charring point of the said product being about 250 to 270° C.

10. A shaped manufactured article of a cellulose ester, formed from a primary acidylation product of cellulose free from any linked residual catalyst and containing practically the percentage of acid which theoretically corresponds to a triester, by a mild acid saponification process which reduces the acid content by 5% at the utmost, the product thus obtained containing a plastifier.

11. A shaped manufactured article of a mixed cellulose ester, formed from a primary acidylation product of cellulose free from any linked residual catalyst and containing practically the percentage of acid which theoretically corresponds to a triester, by a mild acid saponification process which reduces the acid content by 5% at the utmost.

12. A shaped manufactured article of a cellulose acetate, this latter being formed from a primary acetate which is free from any linked residual catalyst and contains practically the theoretical acid content of a triester, by a mild acid saponification process, the acetate thus produced having an acid content of about 57.3 to 61% and a charring point of 250 to 270° C.

13. In the manufacture of shaped articles of cellulose acetate, the process which comprises acetylating cellulosic material, while in fibrous form, to a triacetate acetylation product substantially insoluble in acetone but soluble in a mixture of methylene chloride and alcohol, by employing an acetylation mixture capable of holding the material in fibrous form and being free from catalysts partly remaining in linked form in the non-saponified product and causing instability thereof: saponifying the triacetate product by means of a weakly acid bath until the acetic acid content of said product is reduced about 1 to 5 percent by weight, but without substantially altering its solubility characteristics, and then forming the resulting product into a finished shaped article without other hydrolytic decomposition of the cellulose acetate.

14. A shaped manufactured article of cellulose acetate having an acetic acid content of about 1 to 5 per cent below that of cellulose triacetate; being substantially insoluble in acetone while soluble in a mixture of methylene chloride and alcohol; having substantially the tensile strength, resistance to moisture and insulating power of cellulose triacetate but having, when in the form of a film, a breaking strength on bending, and an elongation, in comparison with a film of the triacetate, of about 160 to 210 per cent and 120 to 188 per cent, respectively, and having a charring point of about 250 to 270° C; said manufactured article being produced by acetylating cellulosic material to a triacetate product by employing an acetylating bath free from catalysts partly remaining in linked form in the non-saponified product and causing instability thereof, saponifying the triacetate product by means of a weakly acid bath until the acetic acid content has been lowered about 1 to 5 per cent by weight, below that of the triacetate product, and then forming the resulting product into a finished shaped article without other hydrolytic decomposition of the cellulose acetate.

15. In the process of manufacturing cellulose esters, the process which comprises esterifying cellulosic material to form a cellulose triester by treating the same with an esterifying bath free from catalysts partly remaining in linked form in the non-saponified product and causing instability thereof, and partly saponifying the triester product by treating it with a dilute mineral acid from a group consisting of hydrochloric, nitric and perchloric acids, until its acid content is reduced by an amount equaling from about 1 to 5 per cent by weight without substantially altering the solubility characteristics of the original cellulose triester.

RICHARD MÜLLER.
MARTIN SCHENCK.
WILHELM WIRBATZ.